US006826826B2

(12) United States Patent
Geary

(10) Patent No.: US 6,826,826 B2
(45) Date of Patent: Dec. 7, 2004

(54) INTERCONNECTION OF MACHINE FOR EFFECTING MULTIPLE ORIENTATION OF LINEAR MOTION SLIDES

(75) Inventor: James Geary, Fairfield, CT (US)

(73) Assignee: Robohand, Inc., Fairfield, CT (US)

( * ) Notice: Subject to any disclaimer, the term of this patent is extended or adjusted under 35 U.S.C. 154(b) by 0 days.

(21) Appl. No.: 10/390,434

(22) Filed: Mar. 17, 2003

(65) Prior Publication Data

US 2003/0208898 A1 Nov. 13, 2003

Related U.S. Application Data

(63) Continuation of application No. 09/520,569, filed on Mar. 8, 2000, now abandoned, which is a continuation of application No. 08/958,847, filed on Oct. 28, 1997, now abandoned, which is a continuation of application No. 08/717,567, filed on Sep. 23, 1996, now abandoned.

(51) Int. Cl.[7] .............................................. B23P 19/00
(52) U.S. Cl. ......................................... 29/757; 29/700
(58) Field of Search .................... 29/525.11, 525.02, 29/401.1, 465, 559, 700, 757; 269/65, 59, 58, 69, 55, 99–101

(56) References Cited

U.S. PATENT DOCUMENTS

5,634,253 A  *  6/1997  Swann ...................... 29/281.1

FOREIGN PATENT DOCUMENTS

JP             145539         *   2/1989

* cited by examiner

*Primary Examiner*—John C. Hong
(74) *Attorney, Agent, or Firm*—McCormick, Paulding & Huber LLP

(57) ABSTRACT

Machine components for use with automated machine tools such as base slides, thrusters, block slides and the like formed with mounting patterns of complementary holes comprising through bolt holes, tapped holes and dowel pin holes on the mounting surfaces thereof and arranged thereon in a predetermined manner whereby the respective base slides, thrusters, block slides and the like can be ganged in any of a multiple of different orientations to perform various machine operations by directly interconnecting them one to another without the need of individualized adapter plates or transition plates.

6 Claims, 7 Drawing Sheets

INTERCONNECTION OF MACHINE FOR EFFECTING MULTIPLE ORIENTATION OF LINEAR MOTION SLIDES

RELATED APPLICATIONS

This application is a continuation of application Ser. No. 08/958,847 filed Oct. 28, 1997 now abandoned, which is a continuation of application Ser. No. 08/717,567 filed Sep. 23, 1996 now abandoned, which are both herein incorporated by reference and which is a continuation of 09/520,569 filed Mar. 8, 2000 now abandoned.

FIELD OF INVENTION

This invention relates generally to the automated machine tool art, and more specifically to the interconnection of various individual automation components for effecting linear motion such as base slides, lift tables, thruster slides, rotary motion devices and grippers or end effactor devices into various configurations for the purpose of performing test or assembly applications of a repetitive nature.

PRIOR ART

Heretofore, industrial engineers and machine designers choose from the variety of basic individual available automation components and connected them together using adaptor plates to form the require configuration or combination for performing a particular machined function, which are generally of a repetitive nature in accordance with a predetermined program. Each such application or orientation heretofore was customized to suit the particular requirements of the work or machine operation to be performed by the use of adaptor plates. Currently, individual components such as slides, rotary actuators, and grippers are designed with mounting patterns that are specific to their basic shape, size or design; and no consideration is taken into account that they can or must be attached to other automation components to be useful. As a result, such components were utilized individually and comprised only a limited part of the overall use to which such components could otherwise be utilized. In the present state of the art, a machine designer or engineer had to either design or choose from a manufacturer's catalog of adaptor plates, a specific adaptor plate to connect together the desired components to effect the desired machine function or operation. Such adaptor plates have the capability of only interconnecting two components, and usually in only one orientation. Most manufacturers only offer such adaptor plates for effecting the interconnection of their more popular combinations. However, the number of possible combinations for such machine components is considerably larger than that contemplated by the individual manufacture. To effect those combinations which are not standard, the machine designer or engineer had to resort to designing and building a given adaptor plate not offered by the manufacturer. Thus, many manufacturers in the automatic tool machine art devote entire sections of their catalogs and/or have separate catalogs just for listing the available adaptor plate designs limited to the many standard combinations only.

It has been known that a "t" nut and slot connection have been used to effect a connection between certain linear motion devices. There is also the NUMATE type of connection which connects a certain style component to another of the same style in a limited range of sizes. Otherwise, there are no other known means to directly interconnect various types of machine components, or various styles within a given product type, or various sizes between type and styles of machine components to form the various possible combinations to achieve the desired orientations without the need of the many varied and different adaptor plates to achieve the desired orientation.

SUMMARY OF THE INVENTION

The present invention provides a universal system for coupling two or more machine components together in a desired orientation. The system includes at least two machine components each including a base and a movable member coupled to the base, the movable member being configured to operate in response to commands from a controller. The base and the movable member on each component defining a mounting surface such that the each of the mounting surfaces on one of the components is configured to mate with each of the mounting surfaces on another of the components in a plurality of desired orientations.

Thus, the invention provides a universal system for coupling two or more machine components together in various orientations for providing motion for automation applications. The system of the invention eliminates the need for adapter plates for coupling two or more machine components together.

This invention is directed to machine components such as base slides, lift tables, thruster slides, rotary actuators and grippers or the like that utilize a simple set of matching and mating pattern of holes that include through bolt holes, tapped holes and dowel pin holes, the latter providing for locational accuracy, and not necessarily required for effecting the direct interconnection of adjacent components. The hole patterns can be of any size based on the size of the machine component, and the component may carry several hole patterns of different sizes to accommodate the direct interconnection of units of different sizes. The respective components each have a base pattern and an output pattern of holes. The base pattern allows the component to be attached to a machine base or to another component output pattern. The base pattern of any given component is the mounting pattern closest to the machine base in the assembly or combination of attached components.

Essentially, the hole pattern is divided into two sexes, viz. male holes which form clearance through holes for receiving the interconnecting bolts or screws and female holes which are threaded or tapped holes. The holes of a given pattern are arranged in two basic hole configurations within the given pattern, viz. a square configuration and a rectangular configuration. A machine component may have more than one hole pattern for use in interconnecting components of varying sizes. Both configurations, i.e. the square and rectangular configurations making up the hole pattern are centered on the mounting surface of the components which allows for the square configuration to have four possible mounted orientations and two orientations for the rectangular configuration. The arrangement is such that two components can be directly interconnected by using the opposed complementary sex mounting configurations, e.g. male to female. There is also a logic as to what can be normally connected to what, as far as the component types are concerned. For reasons of accuracy, dowel pin holes may be included with the hole pattern.

IN THE DRAWINGS

DETAILED DESCRIPTION

In accordance with this invention, a base slide is defined as an automation machine component used to carry other components in a linear movement from one point to another. The base slide includes two fixed end blocks supporting shafting upon which a carriage slides in a linear reciprocal motion between the fixed end blocks. It will be understood that such base slides can be made in a range of sizes or styles.

A lift table is a machine component used to carry other components in a linear manner from one point to another in a vertical direction, and may be made in any of several sizes or styles. It comprises a main body slidably supporting shaftings upon which a tool plate is connected.

A thruster machine component is used to carry other components from point to point in a straight line which consists of a body slidably supporting shafting having a tool plate connected thereto.

A rotary actuator is a component used to rotate other attached components through a fixed rotation and back again which consists of a body and a connected output shaft or flange; and which can be made in varying sizes.

A gripper is a component used to grasp a work piece or part to position the same as may be required.

In accordance with this invention, the body portion of such machine components is provided with a mounting surface having a hole pattern to which the mounting surface of another machine component may be directly interconnected thereto in a simple, positive and effective manner.

Figure 1:
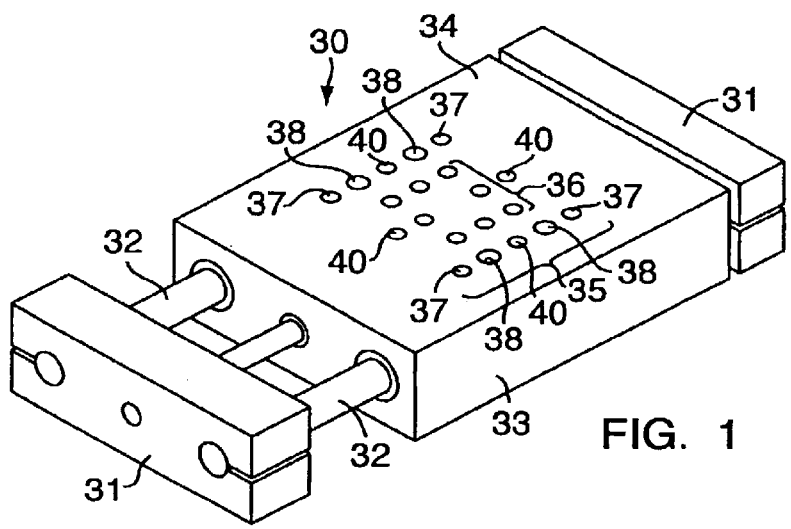
FIG. 1 is a perspective view of a base slide machine component embodying the invention.
Figure 2:
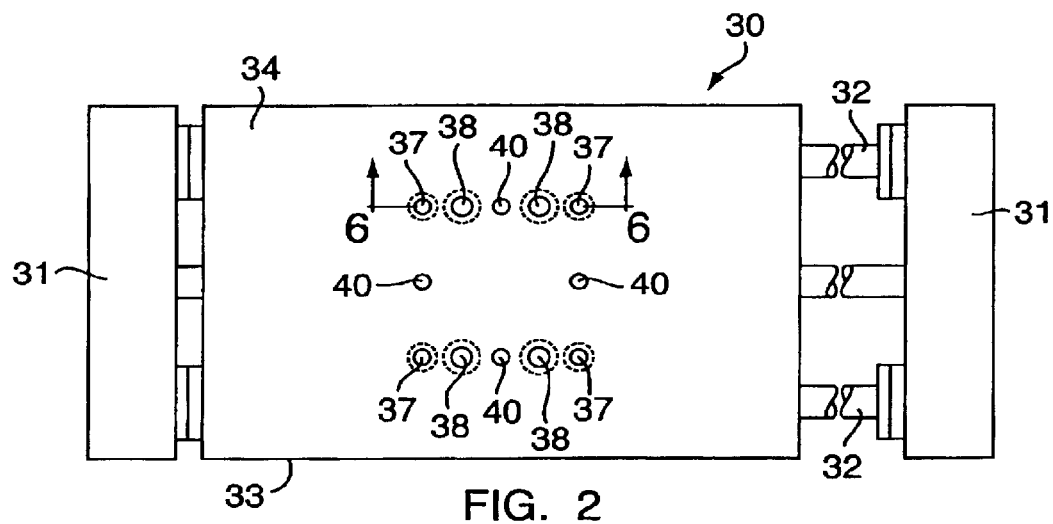
FIG. 2 is a top plan view of FIG. 1 illustrating only the outer hole pattern.

Referring to FIGS. 1 and 2, there is illustrated a base slide 30 embodying the present invention. The base slide 30 comprises a pair of end blocks 31—31 which are adapted to be fixed to a machine base or frame. Supported between the fixed end blocks 31—31 are shafting 32—32 upon which the base slide body 33 is supported for reciprocal linear movement between the end blocks 31—31. As best seen in FIGS. 1 and 2, the base slide body 33 is provided with a mounting surface 34 upon which one or more hole patterns are formed to facilitate the direct interconnection of another machine component as will be hereinafter described.

Figure 6:
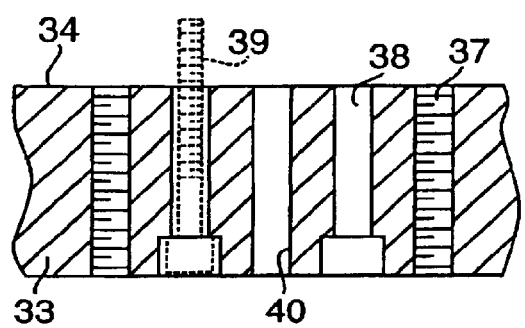
FIG. 6 is a sectional view taken along line 6—6 on FIG. 2.

In the illustrated embodiment of FIG. 1, two hole patterns are shown consisting of an outer hole pattern 35 and a smaller inner hole pattern 36 disposed within the larger outer hole pattern 35. The outer hole pattern 35 comprises four outer corner tapped or threaded holes 37 disposed in a square configuration, and four rectangularly disposed through holes 38 disposed in alignment between the corner tapped holes 37 as shown. The through holes 38 are arranged to receive a bolt or screw 39 by which two components may be directly interconnected in face to face relationship in a plurality of different orientations. The hole pattern 35 described with respect to the base slide 30 may be defined as the female pattern as the tapped or threaded holes define the outer square corners of the pattern. Included within the hole pattern are two or more dowel pin holes 40. As shown in FIGS. 1 and 2, four such dowel pin holes 40 are illustrated as being disposed in a diamond configuration wherein each dowel pin hole 40 is disposed midway between adjacent outer or corner tapped holes 37. The dowel pin holes 40 are provided to insure accuracy of orientation and are not necessarily required for effecting the interconnection. The tapped holes 37 may extend partly into the slide body 33 to a predetermined depth or may be machined through the slide body. The through bolt holes 38 may be counterbored on the back side of the slide body to define a seat or recess for the bolt head, as shown in FIG. 6.

Figure 3:
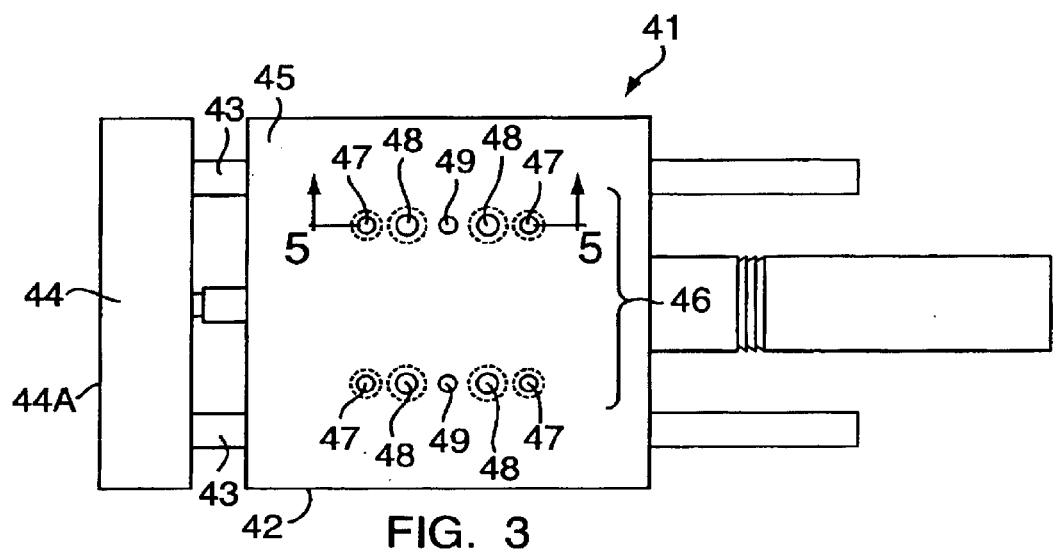
FIG. 3 is a top view of a thruster machine component.
Figure 4:
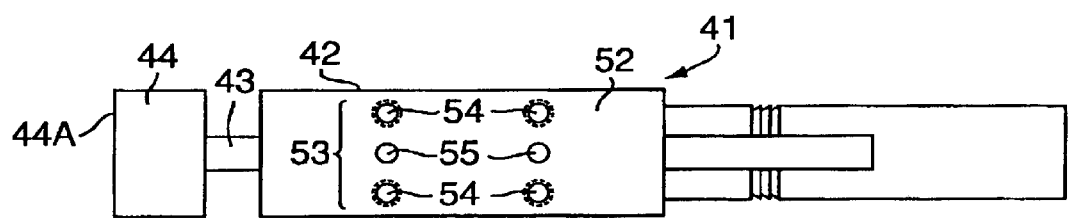
FIG. 4 is a side view of a machine component of FIG. 3.
Figure 5:
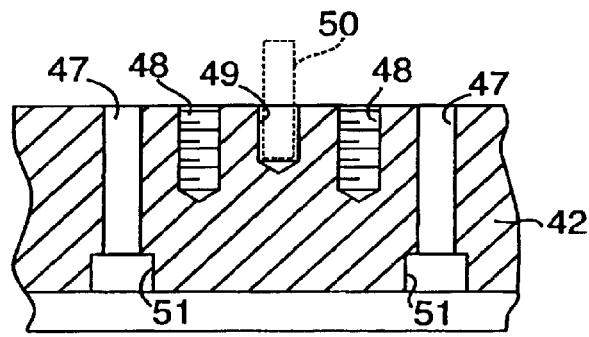
FIG. 5 is a fragmentary sectional view taken along line 5—5 on FIG. 3.

A companion component in the form of a thruster 41, which may be directly interconnected to the base slide 30, is illustrated in FIGS. 3 and 4. As shown, the thruster 41 comprises a thruster body 42 supporting shafting 43 reciprocally mounted therein. Connected to the ends of the reciprocating shafts 43 is an end block 44 to which another machine component can be directly interconnected, as will be herein described. The thruster body 42 has a mounting face 45 which includes a male hole pattern 46. As shown, the male hole pattern comprises four through bolt holes 47 which are disposed in a square configuration that form the corners of the male pattern 46. Disposed between two of the through bolt corner holes 47 are four tapped or threaded holes 48 arranged in a rectangular configuration. Disposed midway between the through corner holes 47 and the tapped holes 48 is a dowel pin hole 49 for receiving a dowel pin 50. As hereinbefore described, the tapped holes 48 may be machined to a predetermined depth, as shown, or machined through the depth of the thruster body 42. Also, the back side of the through bolt holes 47 may be counterbored to form a seat 51 for the bolt head.

The thruster body 42 may also be provided with a side mounting face 52 having a hole pattern 53 to which another machine component may be connected. The side mounting face hole pattern 53 comprises four tapped or threaded holes 54 disposed in a rectangular configuration with a dowel pin hole 55 disposed between the tapped holes 54.

Figure 7:
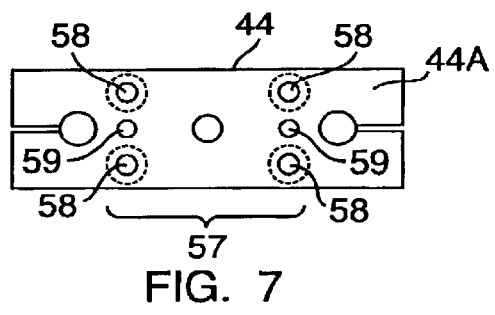
FIG. 7 is an end view of the end block of the thruster illustrated in FIG. 3.
Figure 8:
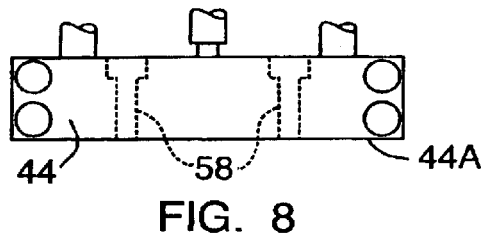
FIG. 8 is a top view of FIG. 7.

The end block 44 of the thruster is also provided with a mounting face 44A to which a machine component may be directly interconnected thereto. The mounting face 44A of the end block 44 is also provided with a male hole pattern 57 comprising four through bolt holes 58 which are rectangularly disposed to mate with rectangularly disposed female hole patterns formed on the mounting face of another complementary component, e.g. the side mounting surface of a thruster similar to that herein described. It will be understood that the back side of the through holes 58 on the end block 44 of the thruster may be also counterbored to define a seat or recess for receiving the head of a mounting bolt or screw. Disposed between the vertically disposed corner through holes 58, as seen in FIG. 7 of the thruster end block, are the dowel pin holes 59.

Block slides and lift tables may likewise be provided with complementary male and female hole patterns as hereinbefore described for interconnection to each other and/or to the base slides and thrusters herein described.

With the construction disclosed, the various base slides, thruster, grippers and like components may be directly interconnected without the need of adaptor plates as heretofore required.

Figure 9:
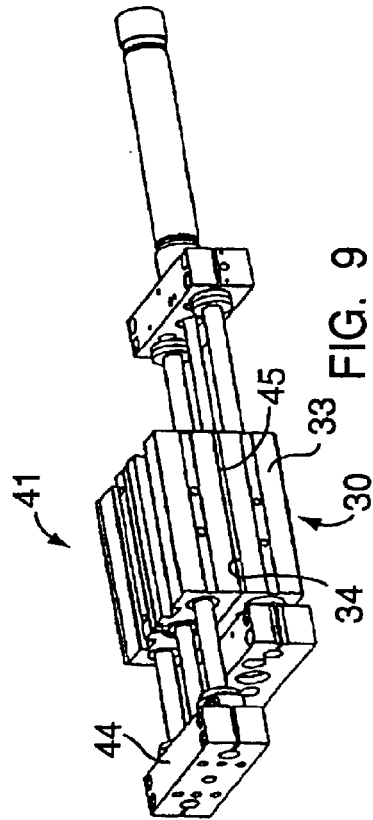
FIG. 9 is a perspective view illustrating the direct interconnection of a thruster slide on a base slide illustrating one direction of orientation.

Reference is made to FIGS. 9 to 12, wherein there is illustrated various orientations of how a thruster 41, as described herein, may be interconnected to a base slide 30. As shown in FIG. 9, the mounting face 45 of the thruster 41 is interconnected to the mounting face 34 of the base slide body 33 by fastening bolts extended through the through holes 47 of the thruster 41 for threading into the corner tapped holes 37 of the base side body 33. As shown in FIG. 9, the end block 44 of the thruster 41 is oriented to the left.

Figure 10:
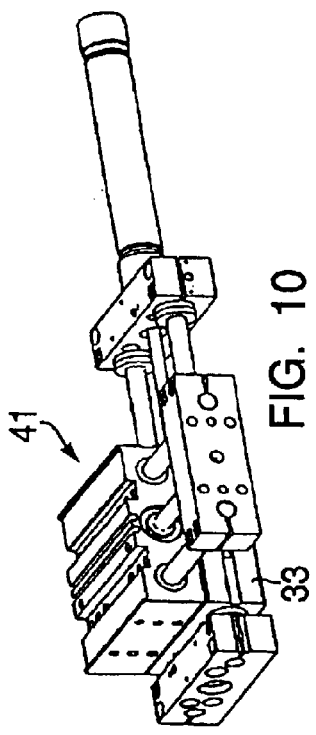
FIG. 10 is a view similar to that of FIG. 9, but illustrating another orientation.
Figure 12:
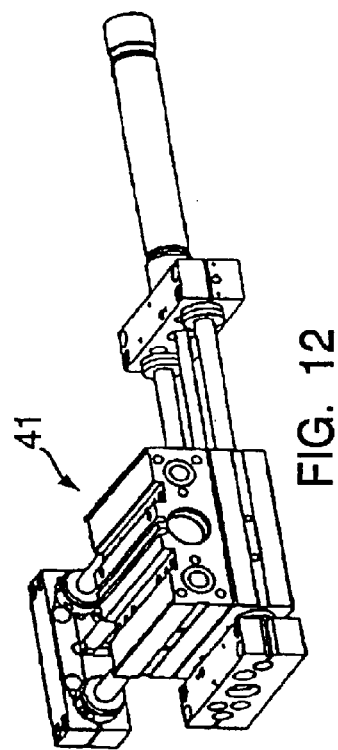
FIG. 12 is a view similar to that of FIG. 11, but illustrating another orientation.
Figure 11:
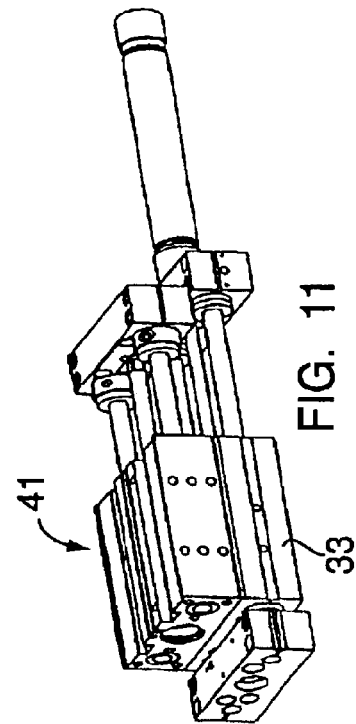
FIG. 11 is a view similar to that of FIG. 10, but illustrating a further orientation.

In FIG. 10, the thruster 41 is interconnected to the slide body 33 in an orientation which is 90° counterclockwise to that illustrated in FIG. 9. FIG. 11 illustrates the thruster 41 oriented 180° relative to the orientation of FIG. 9, and in FIG. 12, the thruster 41 is oriented 270° counterclockwise from that of FIG. 9.

Figure 13:
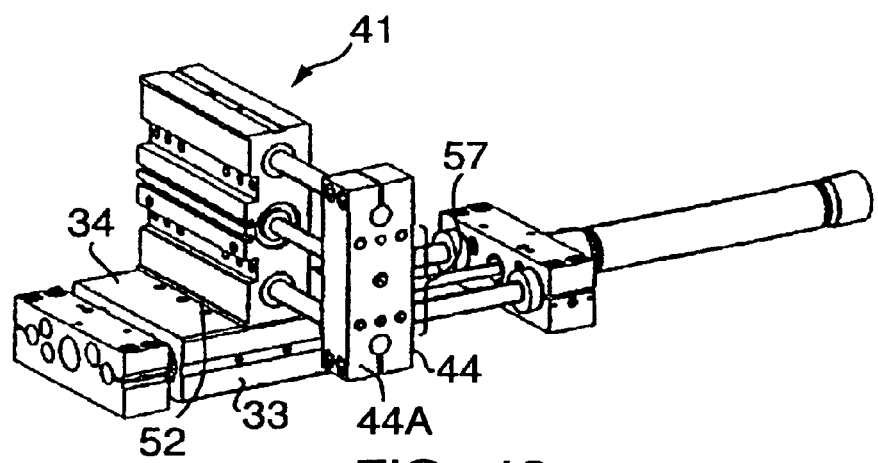
FIG. 13 is a perspective view illustrating another orientation of side mounting a thruster slide to a base slide.
Figure 14:
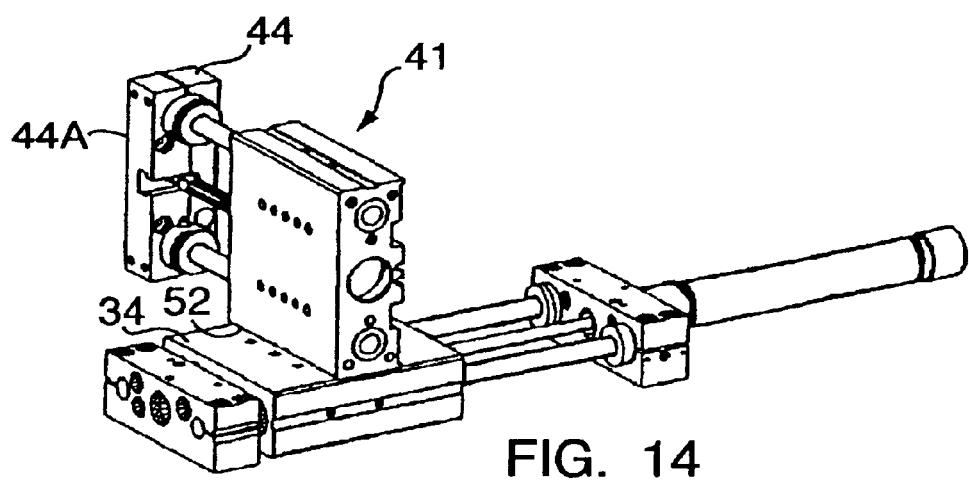
FIG. 14 is a view similar to that of FIG. 13, illustrating another orientation.

FIGS. 13 and 14 illustrates another combination wherein the thruster 41 is interconnected directly to the mounting surface 34 of a slide body 33 with a side mounting. As shown, the side mounting surface 52 of the thruster 41 is directly connected to the mounting surface 34 of the slide block body 33 by extending the fastening bolts through the rectangularly disposed male hole 38 configuration of the slide body 31 to engage the rectangularly disposed female hole 54 configurations formed in the side mounting surface 52 of the thruster 41. As shown in FIGS. 13 and 14, the thruster 41 can be oriented in two directions, 180° apart.

It will be understood that another machine component, such as gripper, lift table, or another thruster can be directly mounted to the mounting face 44A on the end block 44 of the thruster 41 by extending fastening bolts through the rectangular male hole pattern 57 on the end block 44 to engage complementary female hole pattern as hereinbefore described, formed in the machine component, e.g. a thruster 41, for attachment to the end block 44.

Figure 16:
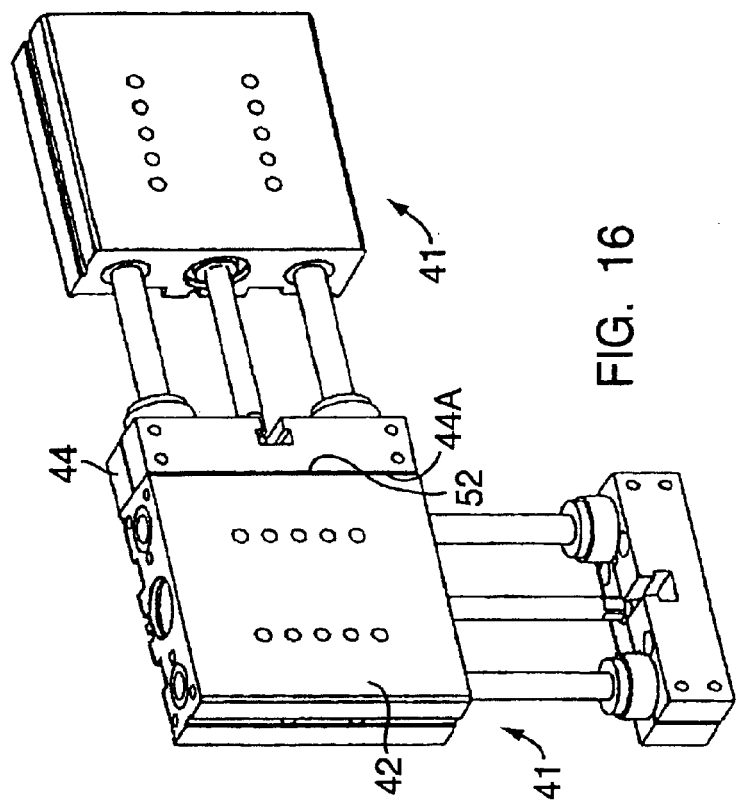
FIG. 16 is a view similar to that of FIG. 15, but illustrating another orientation thereof.
Figure 15:
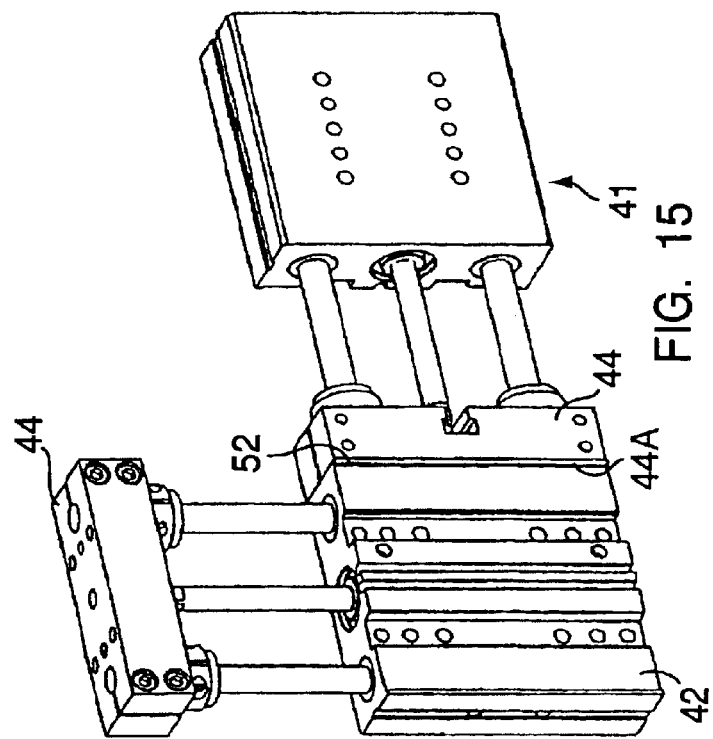
FIG. 15 is a perspective view illustrating the end block of one thruster being connected to the side of a second thruster having the end block oriented in a particular direction.

FIG. 15 and FIG. 16 illustrate the end block 44 of one thruster 41 directly interconnected to the side mounting face 52 of a similarly constructed thruster 41. This is achieved by the fastening bolts being extended through the male hole pattern 57 formed on the mounting face 44A of the end block 44 and engaging the complementary rectangularly disposed female hole pattern 53 formed in the side mounting face 52 of the thruster body 42 as hereinbefore described with respect to FIG. 4. Thus, as seen in FIGS. 15 and 16, the thruster 41 can be oriented in two positions, 180° apart, on the end block 44 of a complimentary thruster 41.

Figure 18:
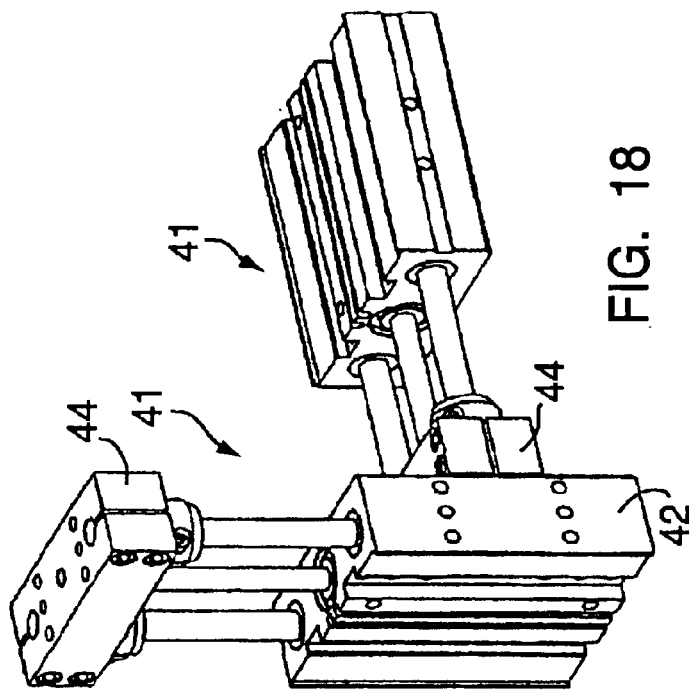
FIG. 18 is similar to that of FIG. 17 but illustrating a further orientation.
Figure 17:
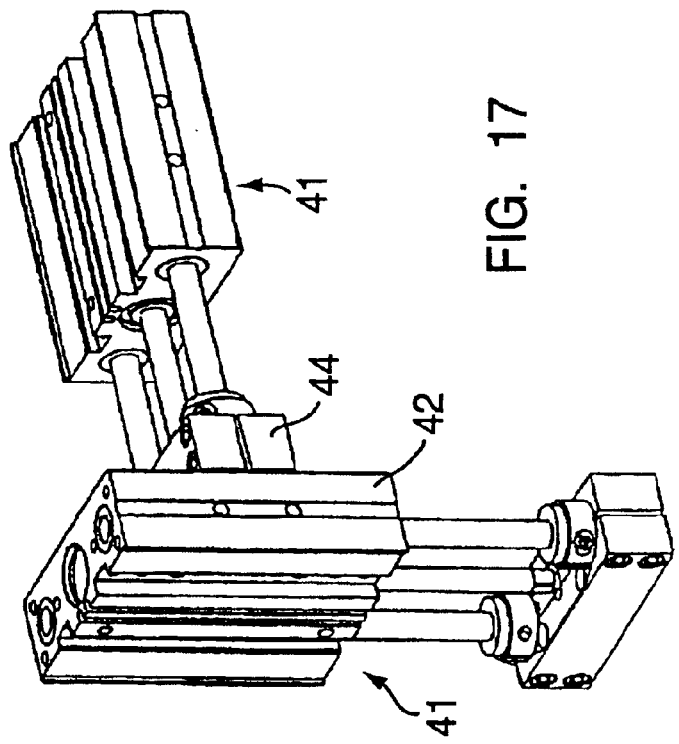
FIG. 17 is a perspective view illustrating the direct interconnection of one machine component to another to achieve another orientation.

FIGS. 17 and 18 illustrate additional combinations of direct interconnect machine components possible by the hole patterns described. In FIG. 17, the end block 44 of one thruster 41 is directly interconnected to the mounting face 45 of another complementary thruster 41 by extending fastening bolts through the male through hole 58 of the end block 44 to engage with the rectangularly disposed female hole configuration 48 formed in the mounting face 52 of a similar thruster body 42. FIG. 18 illustrates a combination wherein the thruster 41 is oriented 180° from that shown in FIG. 17. The interconnection for achieving the various orientations described and those which are possible are accurately effected by the dowel pins located in the complementary dowel pin holes which are included in the described complementary hole patterns.

Figure 19:
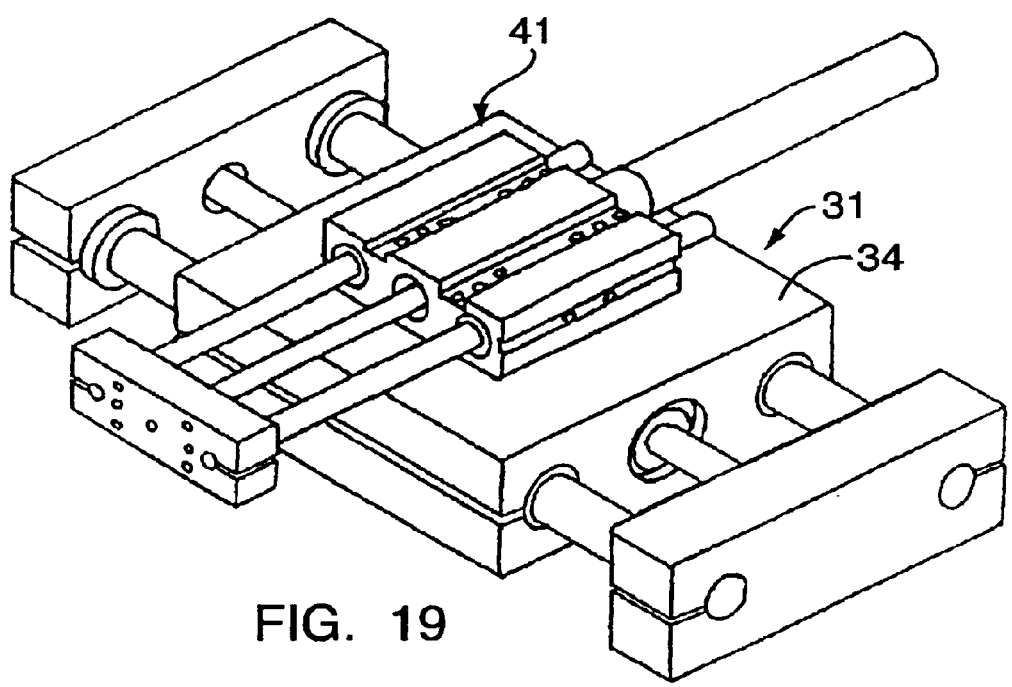
FIG. 19 is a perspective view illustrating various sized machine components interconnected in accordance with the present invention.

FIG. 19 illustrates how various sized machine components can be directly interconnected. In the combination disclosed in FIG. 19, a smaller sized thruster 41 can be connected to the mounting surface 34 of the base slide 30 by fastening screws or bolts extending through the male through holes of the slider block to engage the rectangularly disposed female holes formed in the mounting face of the thruster body 41.

FIG. 19 also shows the thruster 41 and base slide 30 coupled to a controller 100 via communication lines 102. The controller 100 which may include a computer provides the commands for controlling the operation of the machine components.

From the foregoing descriptions, it will be apparent that the machine components to which this invention relates can be directly interconnected in various combinations to achieve various orientations without the use of adaptor plates in a simple and expedient manner.

While the present invention has been described with respect to several embodiments, variations and modifications may be made without departing from the spirit or scope of this invention.

What is claimed is:

1. A universal system for coupling two or more machine components together in a desired orientation, said system comprising:
   at least two machine components each including a base and a movable member coupled to said base, said movable member being configured to move relative to said base in response to commands from a controller;
   said base and movable member on each component defining a mounting surface; and wherein
   each of the mounting surfaces on one of said components being configured to mate with each of the mounting surfaces on another of said components in one of a plurality of desired orientations.

2. A universal system for coupling two or more machine components together as defined in claim 1 wherein each of said mounting surfaces defines a first pattern of holes including a plurality of through holes arranged in a first configuration and a plurality of tapped holes arranged in a second configuration and a second pattern of holes including a plurality of tapped holes in said first configuration and a plurality of through holes in said second configuration, such that at least a portion of said first or second pattern of holes defined by one of said mounting surfaces on said one of said components is alignable with said second or first pattern of said mounting holes respectively, defined by one of said mounting surfaces on said another of said components.

3. A universal system for coupling two or more machine components as defined in claim 2 wherein said mounting surface on said one of said components further comprises a dowel pin and said mounting surface on said another of said components further defines a dowel pin hole, for facilitating alignment of said mounting surfaces one to the other.

4. A universal system for coupling two or more machine components together as defined in claim 1 wherein one of said machine components includes a base slide.

5. A universal system for coupling two or more machine components together as defined in claim 1 wherein one of said machine components includes a thruster.

6. A universal system for coupling two or more machine components together as defined in claim 1 wherein one of said machine components includes a rotary motion device.

* * * * *

UNITED STATES PATENT AND TRADEMARK OFFICE
CERTIFICATE OF CORRECTION

PATENT NO. : 6,826,826 B2 Page 1 of 1
DATED : December 7, 2004
INVENTOR(S) : James Geary It is certified that error appears in the above-identified patent and that said Letters Patent is hereby corrected as shown below:

<u>Title page,</u>
Item [54], Title, should read -- INTERCONNECTION OF MACHINE COMPONENTS FOR EFFECTING MULTIPLE ORIENTATION OF LINEAR MOTION SLIDES --

Signed and Sealed this

Twenty-second Day of March, 2005

JON W. DUDAS
*Director of the United States Patent and Trademark Office*